March 31, 1942.   S. B. KURZINA, JR   2,278,270
BACKPEDALING BRAKE FOR VELOCIPEDES
Filed Dec. 12, 1940
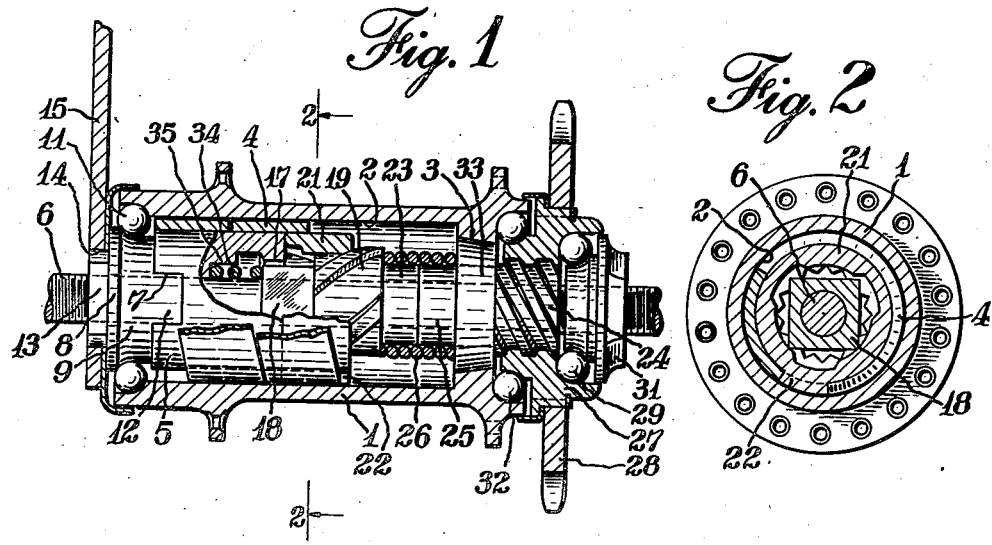
INVENTOR.
Stanley B. Kurzina Jr.

Patented Mar. 31, 1942

2,278,270

UNITED STATES PATENT OFFICE 2,278,270

BACKPEDALING BRAKE FOR VELOCIPEDES

Stanley B. Kurzina, Jr., Elmira, N. Y., assignor to Bendix Aviation Corporation, South Bend, Ind., a corporation of Delaware Application December 12, 1940, Serial No. 369,842

7 Claims. (Cl. 192—6)

The present invention relates to a backpedaling brake for velocipedes and more particularly to a brake employing a novel coiled spring braking element and actuating means therefor.

In those forms of coaster brake which employ a coiled spring brake element, it has been found that the heat generated by prolonged heavy application of the brake causes the brake element to expand and take up the lost motion of the parts so that the brake when hot takes hold more quickly than when cold. It may happen that the expansion becomes so great that lost motion of the applying means is taken up and the brake caused to drag undesirably until it is permitted to cool off.

It is an object of the present invention to provide a novel backpedaling brake which is efficient and reliable in operation while being simple and economical in construction.

It is another object to provide such a device which is so constructed as to operate substantially uniformly irrespective of variations in the temperature of the parts.

It is another object to provide such a device which incorporates a temperature compensated brake element.

It is another object to provide such a device which incorporates unitary means for insuring the engagement of the forward driving mechanism and for effecting the operation of the brake applying mechanism.

A further object is to provide such a device including a threaded element which is longitudinally shiftable from driving position to effect application of the brake, in which a self-tightening frictional clutch controls the rotation of the threaded element.

Further objects and advantages will be apparent from the following description taken in connection with the accompanying drawing in which:

Fig. 1 is a side elevation partly in section and partly broken away showing a preferred embodiment of the invention;

Fig. 2 is a section taken substantially on the line 2—2 of Fig. 1;

Fig. 3 is a detail in perspective of the elements of the brake applying mechanism shown in disassembled relation; and Fig. 4 is a side elevation partly broken away and in section of the spiral brake member.

In Fig. 1 of the drawing, there is illustrated a hub 1 for the wheel of a vehicle such as a velocipede or bicycle, the interior of which hub is generally cylindrical as shown at 2 and is provided with a cone clutch surface 3 at one end. A helical brake member 4 is mounted in the interior of the hub 1 on a cylindrical anchor block 5 which is loosely journalled on an axle 6 and is provided at one end with a diametrical slot 7. A fixed bearing member 8 is threaded on the end of the axle 6 and is provided with a peripheral bearing race 9 for the reception of bearings 11 on which one end of the hub 1 is journalled. This bearing member is provided at one end with a tongue 12 engaging in the slot 7 of the anchor member and at its other end with a squared portion 13 fitting in an opening 14 in an anchor arm 15 which is connected to the frame of the vehicle in such manner as to prevent rotary movement thereof.

The anchor block 5 is provided adjacent its slotted end with a peripheral shoulder 16 forming an anchoring abutment for one end of the brake member 4. The opposite end of the anchor block is provided with a polygonal opening 17 adapted to receive the polygonal end 18 of a screw shaft 19 slidably mounted on the axle 6. In order to provide for an easily slidable splined connection between the anchor block and screw shaft 19 which is capable of rotary adjustment, the opening 17 is formed star-shaped with the sides of the points arranged at right angles, and the end 18 of the screw shaft is squared. As here shown, the opening 17 is provided with sixteen points whereby the screw shaft may have a splined connection with the anchor block which is adjustable through angles of $22\frac{1}{2}$ degrees.

The screw shaft 19 is provided with a multilead thread here shown as a triple thread, and a nut 21 is mounted thereon in abutting relation to the end of the anchor block 5, and is provided with a peripheral shoulder 22 adapted to engage the free end of the brake member 4.

The end of the screw shaft 19 opposite to the squared end 18 is formed as a cylinder 23, and a second screw shaft 24 is journalled on the axle 6 in abutting relation thereto and provided at one end with a cylindrical portion 25 of the same diameter as the cylinder 23. An overrunning clutch connection between the two screw shafts is provided in the form of a spiral spring 26 mounted on the cylinders 23 and 25 and adapted to wrap down and grip said cylinders upon backward rotation of the screw shaft 24 but to unwrap and transmit only a light frictional drag therebetween upon forward rotation of the screw shaft 24.

A driving member 27 having a driving sprocket 28 fixed thereon is threaded on the screw shaft 24 and is journalled on the axle 6 by means of bearings 29 running on an adjustable cone 31 threaded on the axle. The driving member 27 is journalled within the adjacent end of the hub 2 by means of bearings 32.

Screw shaft 24 is provided medially thereof with a conical clutch surface 33 adapted to engage the interior clutch surface 3 of the hub 2 in order to transmit rotation from the screw shaft to the hub upon forward rotation thereof.

Means are preferably provided for maintaining the non-rotatable screw shaft 19 in engagement with the driving screw shaft 24. As here shown, this means is in the form of a compression spring 34 mounted on the axle 6 in an internal recess 35 within the anchor block 5 and abutting against the squared end 18 of the screw shaft 19.

In operation, forward rotation of the sprocket 28 and driving member 27 causes the driving screw shaft 24 to be moved to the right in Fig. 1, which longitudinal motion is insured by reason of the light frictional drag of the clutch spring 26 from the splined screw shaft 19, as well as the expansive pressure of the compression spring 34, whereby the clutch surface 33 is caused to engage the clutch surface 3 of the hub and connect the hub for rotation with the driving member. When rotation of the driving member ceases as in coasting, the continued rotation of the hub 1 causes the driving screw shaft 24 to overrun the driving member 27 slightly and release the clutch 3, 33, after which the hub is permitted to overrun freely. Backward rotation of the driving member 27 by the operator causes the driving screw shaft 24 to be moved to the left in Fig. 1 since it is now coupled by the clutch spring 26 to the splined brake actuating screw shaft 19 and is therefore prevented from backward rotation. The driving screw shaft 24 thus is caused to push the splined screw shaft 19 along the axle 6, and since the nut 21 is prevented from longitudinal movement by reason of its abutting relation with the anchor member 5, the nut is caused to rotate in a forward direction by reason of its threaded connection to the screw shaft 19. This forward rotation of the nut 21 is imparted to the free end of the brake member 4 by means of the shoulder 22, and since the opposite end of the brake member is held from rotation by its abutment with the shoulder 16 on the anchor block 5, this rotary movement of the free end causes the brake to expand and frictionally engage the interior of the hub 1 so as to retard the rotation of the hub.

When the vehicle is so decelerated, the kinetic energy thereof is transformed into heat which is dissipated throughout the hub and the brake mechanism therein. As above stated, the rise in temperature of the brake member as usually constructed may cause it to expand more than the hub and therefore to drag on the interior of the hub. According to the present invention, the spiral brake member 4 is so formed that a rise in temperature thereof causes little or no thermal expansion and may, if desired, actually cause it to contract. This is accomplished by forming the brake from a strip of bimetallic material, the outer layer 36 being formed of some suitable material such as brass or bronze having a comparatively high coefficient of thermal expansion, whereas the inner layer 37 is formed of a different metal such as steel having a lower coefficient of expansion. The two layers are preferably welded or brazed together in such manner as to prevent separation whereby the brake member is unitary in construction. By the selection of suitable metals and relative thicknesses of the layers, the greater expansion of the outer layer may be caused to curl the sleeve more tightly as the temperature rises, thus reducing the diameter of the coil, and increasing the clearance between the coil and the interior of the hub.

In assembling the brake, the adjustability of the brake operating screw shaft 19 in the anchor member 5 in conjunction with the triple lead threaded connection of the nut 21 with said screw shaft, provides a differential rotary adjustment for the nut 21 whereby the parts may be assembled with as little lost motion as desired. Close adjustment of the parts is made practicable by the above-described bimetallic construction of the brake which eliminates the possibility of dragging of the brake due to heating of the parts.

Since the clutch spring 26 snugly encircles the cylinders 23 and 25 of the screw shafts, its clutching action on the driving screw shaft 24 is practically instantaneous. The combination of the bimetallic brake member, the differential adjustment of the nut 21 and the instantaneously effective clutch 26 thus provides a brake in which the parts may be arranged to have a minimum amount of lost motion with consequent wide latitude of effective brake applying movement and long continued operative condition of the brake.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In a backpedaling brake for velocipedes, a wheel hub, driving means therefor, a helical stationary brake member in the hub, said brake member being so constituted that a rise in its temperature will increase its diameter less than the same temperature rise will expand the hub, and means responsive to backward rotation of the driving means for expanding the brake member into frictional engagement with the interior of the hub.

2. In a backpedaling brake for velocipedes, a wheel hub, driving means therefor, a helical stationary brake member in the hub comprising integrated layers of metal having dissimilar coefficients of thermal expansion, the layer having the higher coefficient being on the outside of the helix whereby a rise in temperature of the brake member causes it to curl up into a helix of smaller diameter, and means responsive to backward rotation of the driving means for expanding the brake member into frictional engagement with the interior of the hub.

3. In a backpedaling brake for velocipedes, a wheel hub, a helical brake member therein, a fixed anchor for the brake member, and means for expanding the brake member including a screw shaft splined to the anchor, a nut thereon engaging the brake member, a driving member, a driving screw shaft threaded therein in abutting relation to the splined screw shaft, and a coiled spring member encircling the adjacent ends of the screw shafts and adapted to grip them to prevent backward rotation of the driving screw shaft upon backpedaling, whereby to cause said nut to expand the brake member.

4. A backpedaling brake as set forth in claim 3 in which the coiled spring is arranged to apply a slight frictional drag to the driving screw shaft to resist forward rotation thereof.

5. In a coaster brake for velocipedes, a hub, a coiled spring brake member therein, an anchor for one end of the brake member, a screw shaft splined to the anchor, a nut on the screw shaft in abutting relation to the anchor having a shoulder engaging the other end of the brake member, driving means for the hub including a longitudinally movable member, means whereby backward rotation of the driving means moves the longitudinally movable member to engage and move the screw shaft longitudinally, thereby causing rotation of the nut to expand the brake member into engagement with the hub, and yielding means maintaining the screw shaft in engagement with the longitudinally movable member.

6. A coaster brake as set forth in claim 5 in which the brake member is so constituted that a rise in its temperature will increase its diameter less than the same temperature rise will expand the hub whereby a rise in temperature of the brake member and hub tends to release the brake.

7. A coaster brake as set forth in claim 5 including a coiled spring clutch adapted to connect the longitudinally movable member to the screw shaft to prevent backward rotation of the longitudinally movable member.

STANLEY B. KURZINA, JR.